July 9, 1968
G. W. MILLER
3,391,898
ACTUATING MECHANISM
Filed Dec. 29, 1965
2 Sheets-Sheet 1
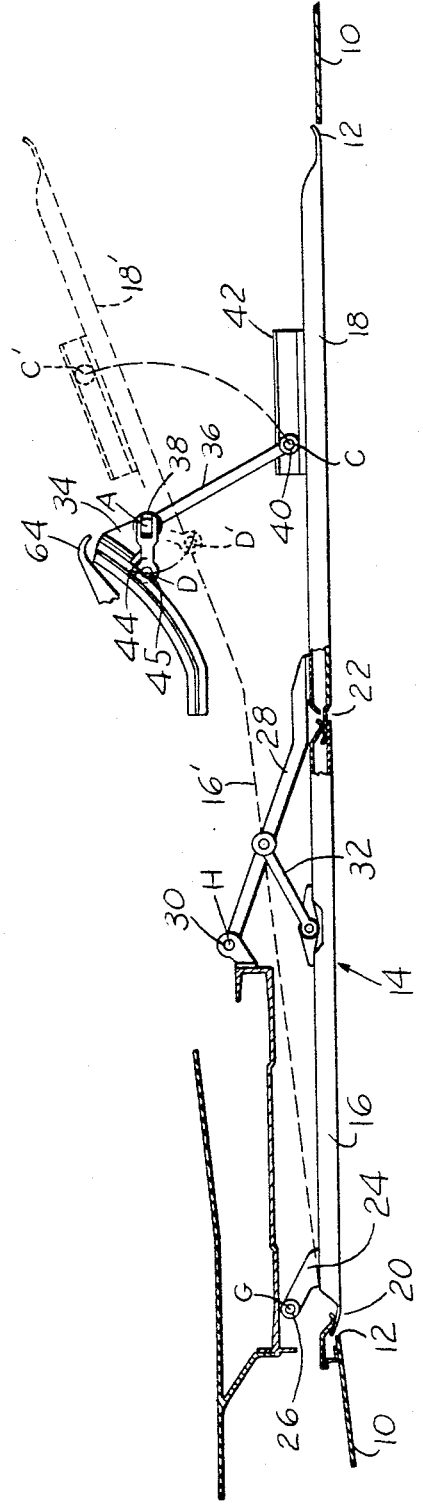
INVENTOR
GUY W. MILLER
BY *Fulmer + VanKirk*
ATTORNEYS

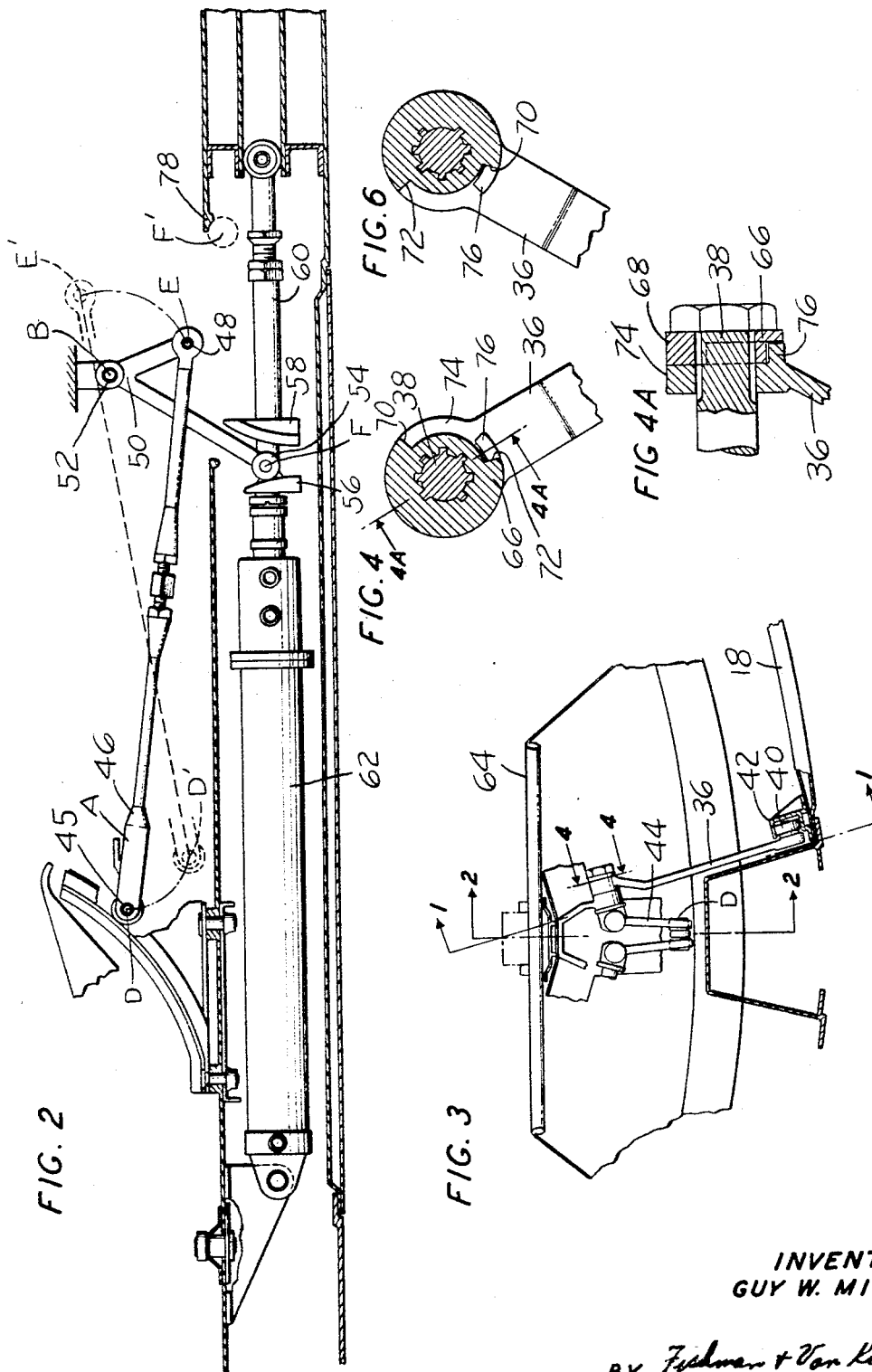

United States Patent Office 3,391,898
Patented July 9, 1968

3,391,898
ACTUATING MECHANISM
Guy W. Miller, Vernon, Conn., assignor to United Aircraft Corporation, East Hartford, Conn., a corporation of Delaware
Filed Dec. 29, 1965, Ser. No. 517,297
11 Claims. (Cl. 251—58)

ABSTRACT OF THE DISCLOSURE

An actuating mechanism for aircraft jet engine blow-in doors. The actuating mechanism allows the doors to free float between the open and closed position through a lost motion mechanism or the equivalent thereof, and the actuating mechanism drives the doors either to the full open position or the full closed position upon receipt of a proper signal.

---

This invention relates to blow-in doors for jet engines. More particularly, this invention relates to an actuating system for free floating blow-in doors.

The general concept of blow-in doors is known in the art; see e.g., U.S. Patent No. 3,057,150. As described in that patent, blow-in doors are usable in conjunction with a jet engine thrust reverser to provide an exit from the engine for the reverse flow of gases. The blow-in door actuating mechanism of the present invention is especially suitable for use with my copending application filed contemporaneously herewith for Folding Flap Thrust Reverser.

The blow-in door actuating mechanism of the present invention allows the blow-in doors to float freely during normal, i.e., non-thrust reversal, operation of the engine. The free floating doors assume positions between full open and full closed depending upon the pressure balance across the doors from inside the engine to outside the engine. When it is desired to go into a thrust reversal mode of operation, most of the doors are positively driven to the full open position to provide for escape openings for the reversed flow of hot engine gases. Since it is harmful for the hot engine gases to impinge directly on air frame parts such as wings and fuselage, certain of the doors spaced circumferentially around the engine are selected to remain closed so that thrust reversal gases will not be directed to air frame parts. These selected doors are driven to the full closed position when the other doors are being driven to full open position.

The present invention also incorporates a sequencing capacity in that the doors are locked either full open or full closed, as the case may be, for thrust reversal, and the driving element is then disengaged from the rest of the door mechanism and can proceed to deliver a driving force for operation of associated thrust reversers.

Accordingly, one object of the present invention is to provide a novel blow-in door actuating mechanism which allows the doors to normally free float and which actuates doors to a locked full open position for thrust reversal.

Another object of the present invention is to provide a novel blow-in door actuating mechanism which normally allows the doors to free float and which selectively activates some doors to a full open position and other doors to a full closed position for thrust reversal.

Anther object of the present invention is to provide a novel blow-in door actuating mechanism having a sequencing capacity to actuate thrust reversal mechanism after the doors have been properly positioned.

Other objects and advantages will be apparent from the following description and drawings.

In the drawings:
FIG. 1 is a sectional view of a blow-in door unit and part of actuating mechanism.
FIG. 2 is a sectional view showing another part of the actuating mechanism.
FIG. 3 is a view looking upstream from the discharge end of the engine and shows the connection between the mechanisms in FIGS. 1 and 2, FIG. 1 being taken along line 1—1 of FIG. 3, and FIG. 2 being taken along line 2—2 of FIG. 3.
FIG. 4 is a view taken along line 4—4 of FIG. 3.
FIG. 4a is a cross sectional view taken along line 4a—4a of FIG. 4.
FIG. 5 is a view showing a part of the mechanism of FIG. 1 for use in keeping selected doors closed.
FIG. 6 is a view similar to FIG. 4 for mechanism used with the structure of FIGURE 5.
FIG. 7 is a view of actuating mechanism for an alternative structure.

Referring now to FIG. 1, a jet engine with an outer casing 10 has an opening 12 in which is located a blow-in door assembly 14 having a door 16 and a door 18. Door 16 has a sliding fit connection 20 with case 10 to allow door 16 to move relative to case 10, and door 18 is connected to door 16 by a similar sliding fit connection 22 to allow door 18 to move both with door 16 and relative to door 16. Door 16 is connected by flange 24 to a fixed pivot 26 so that door 16 rotates about pivot 26. Door 18 is fixed to a rod 28 which in turn pivots about a fixed pivot 30 so that door 18 rotates about pivot 30. A unison link 32 is pivotably connected at one end to rod 28 and is connected at the other end to door 16 to insure that the door structure of doors 16 and 18 moves as a unit, although sliding fit 22 allows door 18 to move at a different rate than door 16. A plurality of door assemblies 14 are located around the periphery of the engine.

Another part of the linkage mechanism includes a fixed flange 34 with a rod 36 pivotably mounted thereon by a pivot pin 38. One end of rod 36 has a roller 40, and roller 40 rides in a track 42 attached to door 18. The other end of rod 36 is connected through pin 38 to an arm 44 which is in turn pivotably connected by a pin 45 to an adjustable rod 46 shown in FIG. 2.

Referring now to FIG. 2, the other end of rod 46 is connected by a pivot pin 48 to one arm of a bellcrank 50 which is in turn supported at a fixed pivot 52. The other arm of bellcrank 50 carries a roller or cam follower 54 which is positioned between cams 56 and 58 on a driving rod 60. Driving rod 60 is driven by a power cylinder 62. Movement of driving rod 60 to the right acts through bellcrank 50, rod 46, arm 44 and rod 36 to actuate the door assembly of doors 16 and 18.

Referring now to FIG. 3, the door mechanism is seen viewed from the exhaust end of the engine. A variable area nozzle 64 is shown, nozzle 64 being of the type that is movable radially to vary nozzle area. FIG. 3 also shows the connection between arm 44 and arm 36, and the connection between arm 36 and track 42 on the side of door 18. It will be understood that the other side of door 18 is similarly connected to another arm 36 and a complete linkage mechanism back to a power cylinder.

Referring now to FIGS. 4 and 4a, the connection between arm 44 and rod 36 is shown in detail. Pin 38 is splined to a sleeve 66, the spline having a blank portion for the purpose of assuring proper alignment between parts. The end of sleeve 66 contains a built up portion or step 68 which extends only part way around the sleeve leaving a gap between the ends 70 and 72 of the stepped portion. A collar 74 on the end of rod 36 rides on sleeve 66, and collar 74 carries a projection 76 that rides in the space between the ends 70 and 72 of step 68. The outer portion of sleeve 68 in contact with collar 74 acts as a bearing so that rod 36 is free to rotate between the step ends 70 and 72 until there is contact between either step end and projection 76, end 72 corresponding to the full closed position of the door assembly and end 70 corresponding to the full open position.

Since rod 36 is normally free to rotate partly around pin 38, doors 18 and 16 are normally free to move between the fully closed position shown in the full lines in FIG. 1 and the fully opened position 18' and 16' shown in phantom in FIG. 1 in response to pressures and aerodynamic forces across the doors. Unison link 32 assures movement of both doors, door 18 pivoting about point H and door 16 pivoting about point G, and sliding fit connection 22 allows the doors to move at different rates with respect to each other. During non-thrust reversal, the doors might normally be in any position between and including full open and full closed depending on pressures and aerodynamic forces across the doors.

When thrust reversal operation is desired, power cylinder 62 receives an appropriate signal to move driving rod 60 to the right. Cam 56 contacts cam follower 54 and rotates bellcrank 50 counterclockwise about point B to move point E to point E' as point F moves to F'. The counterclockwise rotation of bellcrank 50 pulls rod 46 to the right and causes a counterclockwise movement of point D on arm 44 to D' (see both FIG. 1 and FIG. 2). Since arm 44 is fixed on pin 38, pin 38 is also caused to rotate counterclockwise thus causing a counterclockwise rotation of sleeve 66 until step end 72 contacts projection 76. Since projection 76 may normally be any place between ends 72 and 70, there may be some free movement of sleeve 66 before contact is made with projection 76. Thus, sleeve 66 with the stepped end 68 may act as a form of lost motion device before making contact with projection 76.

When end 72 contacts projection 76, rod 36 is rotated counterclockwise causing roller 40 to move against track 42 and raise doors 18 and 16 to the open position 18' and 16' as point C on roller 40 is moved to point C'. The door structure of doors 16 and 18 is thus actuated to the full open position for thrust reversal operation.

Referring now to FIG. 2, point F on cam follower 54 will have moved to point F' when the doors reach the full open position, and cam follower 54 will be in contact with stop 78. The distance from stop 78 to cam 56 is greater than the diameter of the cam follower so that cam 56 is free to pass under follower 54 when follower 54 butts stop 78. Thus, driving rod 60 is free to move further to the right and can be used, for example, to provide the driving force to actuate a set of thrust reversers in sequence following the opening of doors 18 and 16. This further movement of driving rod 60 can particularly be used to actuate the thrust reverser disclosed in my copending application filed contemporaneously herewith for Folding Flap Thrust Reverser.

The final position E' of the point E on bellcrank 50 is above pivot point B of bellcrank 50 so that a line drawn between points E' and D' passes above B. This over center position of E' causes follower 54 to lift off cam 56 and bear against stop 78, and the relative positions of D' and E' also causes doors 18 and 16 to be locked in the open position. With the doors in the open position, any force urging them toward the closed position will tend to cause a clockise rotation of rod 36 and thus tend to rotate arm 44 clockwise. However, any force tending to rotate arm 44 clockwise will tend to pull arm 46 to the left, and since the axis of arm 46 is above pivot point B, bellcrank 50 would be urged in a counterclockwise direction. The counterclockwise urging of bellcrank 50 cannot result in any motion since cam follower 54 is already seated against stop 78. Thus, the doors are locked in the open position, and any force tending to close the doors only results in a force further urging bellcrank 50 in the counterclockwise direction to merely increase the force of cam follower 54 against stop 78.

Stowing of the thrust reversers and the returning of the doors 18 and 16 to the normal free floating condition is accomplished by an appropriate signal to power cylinder 62 to move driving rod 60 to the left. Since cam 58 is larger than cam 56, the leftward movement of rod 60 causes cam 58 to contact follower 54 to move the follower away from stop 78, thus moving bellcrank 50 clockwise about point B. The clockwise movement of bellcrank 50 acts through rod 46 to cause a clockwise movement of arm 44, and the clockwise movement of arm 44 moves sleeve 66 clockwise to remove step end 72 from contact with projection 76, thus releasing rod 36 to allow the doors to free float.

During thrust reversal operation, it may be desirable to keep selected doors around the periphery of the engine closed to prevent hot engine gases from impinging on air frame structures. Referring now to FIG. 5 and FIG. 6, mechanism is shown for closing selected door assemblies while the other door assemblies are being moved to the full open position. The rod 36 which is connected to a door assembly to be closed during thrust reversal is rotated to be originally located to the left of the vertical as shown in FIG. 6 for the full closed position of the doors rather than to the right of the vertical for the remaining doors as shown in FIG. 4. Also, the structure of pin 38 is rotated so that projection 76 is in contact with step end 70 in the closed position of the doors, and the doors are free to float as rod 36 moves between step end 70 and step end 72. The remaining actuating mechanism for the structure of FIG. 5 is the same as the actuating mechanism for the other doors, and operation is as previously described. However, when the driving rod connected to the mechanism of FIG. 5 moves to the right to cause the eventual counterclockwise rotation of arm 36, the door 18 in the FIG. 5 structure is driven downward to the full closed position as step end 72 comes in contact with projection 76. This counterclockwise movement of arm 36 drives the door 18 of the FIG. 5 structure downward to the full closed position while other doors are being moved upward to the full open position.

Referring now to FIG. 7, an alternate simplified structure is shown for actuating doors 16 and 18. Doors 16 pivots about a fixed pivot 102, and door 18 is connected to pivot about a movable pivot 104. A unison link 106 interconnects the two doors. An actuator 108 is connected to movable pivot 104, and movable pivot 104 is moved by the actuator in a track 110. The doors are normally free floating, but movement of pivot 104 to the left to move door 18 to the full open position causes a downward force through unison link 106 to drive door 16 to the full closed position. The opening of one door along with the closing of the other door in a two door assembly is a measure designed to minimize or eliminate the flowing of hot gases along the engine nacelle during thrust reversal.

It is to be expressly understood that the present invention is not limited to the specific embodiment illustrated and described, but may be modified or used in other ways without departing from the spirit of the following claims.

I claim:

1. An actuating system comprising a device to be actuated, said device having first and second extreme positions, driving means connected to said device for driving said device to one of said extreme positions, said driving means including means normally permitting said device to move freely between said extreme positions, said device normally being in any position between and including said extreme positions and normally being free to move between said extreme positions, means for releasing said device from said one position to return said device to said normally free condition, and locking means in said driving means for maintaining said device in said one position, said locking means including means for urging at least part of said drive means in a direction to move said device to said one position in response to a force on said device urging said device to the other of said extreme positions.

2. An actuating system as in claim 1 wherein said driving means includes a driving member and a driven member, said driving member being operatively connected to said driven member to drive said device to said one position, and including means for disconnecting said driving member from said driven member upon said device reaching said one position to allow further movement of said driving member with said device in said one position.

3. An actuating system as in claim 2 including means for reconnecting said driving member to said driven member during movement of said driving member opposite to said further movement.

4. An actuating system as in claim 1 including a second device to be actuated, said second device having first and second extreme positions corresponding to the first and second extreme positions of said device, second driving means connected to said second device for driving said second device to the other of said extreme positions concomitantly with the driving of said device to said one position, said second driving means including means normally permitting said second device to move freely between said extreme positions, said second device normally being in any position between and including said extreme positions, and means for releasing said second device from said other position to return said second device to said normally free condition.

5. An actuating system as in claim 4 including locking means in said second driving means for maintaining said second device in said other position, said locking means in said second driving means including means for urging at least part of said second driving means in a direction to move said second device to said other position in response to a force on said second device urging said second device to said one position.

6. A blow-in door system for an exhaust nozzle comprising a door movable between a closed position and an open position, a linkage mechanism connected to said door, lost motion means in said linkage mechanism normally permitting free movement of said door between said closed position and said open position, said door normally being in any position between and including said open and closed positions, driving means connected to said linkage mechanism to drive said door to said open position, means for locking said door in said open position, means for disconnecting said driving means from said linkage mechanism upon said door reaching said open position to allow further movement of said driving means with said door in said open position, and means for reconnecting said driving means to said linkage mechanism during movement of said driving means opposite to said further movement.

7. A blow-in door system as in claim 6 wherein said locking means includes means in said linkage mechanism for urging at least part of said linkage mechanism in a direction to move said door to said open position in response to a force on said door in said open position urging said door to said closed position, and wherein the reconnection of said driving means to said linkage mechanism causes a movement of said linkage mechanism to unlock said door from said open position and return said door to said normally free condition.

8. A blow-in door system as in claim 6 including a second door movable between a closed position and an open position, a second linkage mechanism connected to said second door, lost motion means in said second linkage mechanism normally permitting free movement of said second door between said closed position and said open position, said second door normally being in any position between and including said closed and open positions, and second driving means connected to said second linkage mechanism to drive said second door to said closed position concomitantly with the driving of said door to said open position.

9. A blow-in door system as in claim 8 including second locking means in said second linkage mechanism for locking said second door in said closed position, means for disconnecting said second driving means from said second linkage mechanism upon said second door reaching said closed position to allow further movement of said second driving means, and means for reconnecting said second driving means to said second linkage mechanism during movement of said second driving means opposite to said further movement.

10. A blow-in door system as in claim 6 wherein said means for disconnecting said driving means includes a cam on said driving means, a cam follower on said linkage mechanism driven by said cam and traveling in a predetermined arc, and a fixed stop located on said arc, the distance from said cam to said stop when said cam follower engages said stop being greater than the size of said cam follower so that said cam follower disengages from said cam, and wherein said means for reconnecting said driving means includes a second cam on said driving means, said second cam being larger than said first cam, and said second cam contacting said cam follower during said opposite movement of said driving means to move said cam follower along said arc away from said stop.

11. A blow-in door system for an exhaust nozzle comprising a door unit having first and second doors, said first and second doors having open and closed positions and being normally free to move between said open and closed positions in response to aerodynamic forces on said doors, and means connected to said first and second doors for moving one of said doors to said open position and the other of said doors to said closed position.

References Cited

UNITED STATES PATENTS

| | | | |
|---|---|---|---|
| 788,510 | 5/1905 | Bennett | 137—628 |
| 2,504,006 | 4/1950 | Davis | 251—82 |

ARNOLD ROSENTHAL, *Primary Examiner.*